No. 631,713. Patented Aug. 22, 1899.
G. F. GOODWIN.
EGG SPOON.
(Application filed July 20, 1898.)
(No Model.)
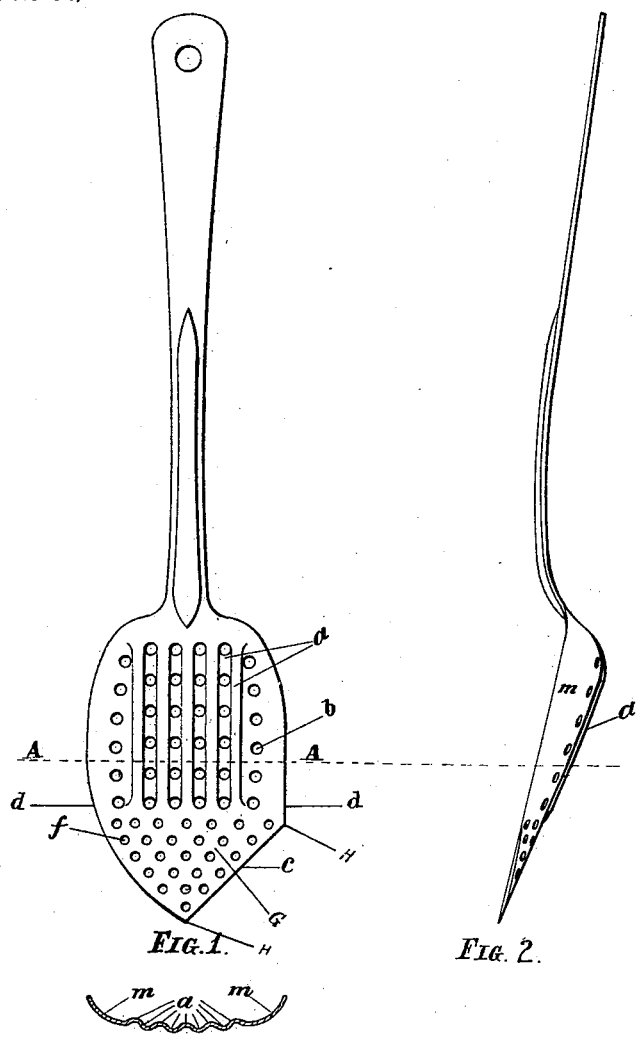
Witnesses
Frank S. Knittle
Frank George
Inventor
Geor. F. Goodwin

UNITED STATES PATENT OFFICE.

GEORGE F. GOODWIN, OF GUTHRIE, WYOMING.

EGG-SPOON.

SPECIFICATION forming part of Letters Patent No. 631,713, dated August 22, 1899.

Application filed July 20, 1898. Serial No. 686,482. (No model.)

*To all whom it may concern:*

Be it known that I, GEORGE F. GOODWIN, a citizen of the United States, residing at Guthrie, in the county of Converse and State of Wyoming, have invented a new and useful Improvement in Egg Spoons and Lifters; and I declare that the following is a clear, full, and exact description thereof, such as will enable others to make and use the same.

The object of the invention is to provide an egg spoon or lifter especially adapted for separating or cutting apart and for lifting eggs from the vessel in which they are cooked. In most devices known to me difficulty is experienced in separating the eggs after they are cooked and in getting them into or onto the spoon or lifter without breaking them and in separating from the eggs the liquid matter in which they are cooked.

In the drawings forming a part of this specification, Figure 1 is an elevation showing the face or upper side of my improved egg-spoon. Fig. 2 is a side or edge view thereof, and Fig. 3 is a section on the line A A of Fig. 1.

$d$ is the flat plate or body part of my improved spoon, having a suitable handle, as shown. This plate or flat part is provided with perforations throughout the greater part of its surface and is corrugated from the base of the bowl near the handle to near the extremity and cutting edge. The corrugations are designated by the letter $a$ and the cutting edge by $c$, the edge being arranged at an angle of about forty-five degrees with the line of the handle. That part of the surface $g$ extending from point and cutting edge to the end of the corrugations is perfectly plane or flat. The rear or back side of the lifter-plate has a flange or rim $m$ gradually rising from the cutting edge to the handle, forming a guard or abutment to prevent the eggs from slipping off the plate as they are lifted from the cooking vessel. The object of the corrugations and perforations is to permit the dropping and the separation of liquid from the cooked eggs as they are taken up by the lifter. The arrangement of the cutting edge at the angle described is important as affording the most convenient application of such cutter by the operator.

Having described my invention, I claim—

An egg spoon and lifter as an article of manufacture, consisting of a plane body or flat plate, provided with perforations throughout its entire surface, with corrugations throughout the greater part of its surface, with a cutting edge arranged at an angle as described, and with a flange or rim merging and rising from the outer end of the cutting edge to the handle.

In testimony whereof I have hereunto set my hand this 8th day of April, A. D. 1898.

GEOR. F. GOODWIN.

Witnesses:
FRANK S. KOUTTLE,
FRANK GEORGE.